(12) United States Patent (10) Patent No.: US 8,616,116 B2
McLaughlin (45) Date of Patent: Dec. 31, 2013

(54) HIGH SPEED BREWING APPARATUS

(75) Inventor: James M. McLaughlin, Seattle, WA (US)

(73) Assignee: Concordia Coffee Company, Inc., Bellevue, WA (US)

( * ) Notice: Subject to any disclaimer, the term of this patent is extended or adjusted under 35 U.S.C. 154(b) by 108 days.

(21) Appl. No.: 13/086,257

(22) Filed: Apr. 13, 2011

(65) Prior Publication Data

US 2011/0212231 A1 Sep. 1, 2011

Related U.S. Application Data

(63) Continuation-in-part of application No. 13/050,852, filed on Mar. 17, 2011, which is a continuation-in-part of application No. 13/038,195, filed on Mar. 1, 2011, now Pat. No. 8,247,010.

(60) Provisional application No. 61/324,267, filed on Apr. 14, 2010, provisional application No. 61/315,847, filed on Mar. 19, 2010, provisional application No. 61/309,401, filed on Mar. 1, 2010.

(51) Int. Cl.
*A47J 31/44* (2006.01)

(52) U.S. Cl.
USPC ............................................ 99/289 R; 99/285

(58) Field of Classification Search
USPC ................................................ 99/285, 289 R
See application file for complete search history.

(56) References Cited

U.S. PATENT DOCUMENTS

| | | |
|---|---|---|
| 332,199 A | 12/1885 | Henderson |
| 2,658,645 A | 11/1953 | Harris |
| 2,733,731 A | 2/1956 | Turak |
| D185,939 S | 8/1959 | Frick |
| D188,154 S | 6/1960 | Frick |
| D192,114 S | 1/1962 | Brosnan |
| 3,085,496 A * | 4/1963 | Reynolds ............... 99/289 R |
| 3,249,196 A | 5/1966 | Maxwell |
| D206,218 S | 11/1966 | Turiace, Jr. |

(Continued)

FOREIGN PATENT DOCUMENTS

| | | |
|---|---|---|
| EP | 1867257 A1 | 12/2007 |
| EP | 2140788 A1 | 1/2010 |

(Continued)

OTHER PUBLICATIONS

Nguyen, Q.H., et al., "Accelerated Low Pressure Brewer," U.S. Appl. No. 13/038,195, filed Mar. 1, 2011.

(Continued)

*Primary Examiner* — Anthony Weier

(74) *Attorney, Agent, or Firm* — Christensen O'Connor Johnson Kindness PLLC

(57) ABSTRACT

A multi-brewer apparatus includes a plurality of brew groups that are configured to be selectively operated either in a ganged mode, wherein plurality of brew groups cooperate to rapidly produce a larger quantity of brewed beverage at a single dispensing location, or in a independent mode wherein the plurality of brew groups operate independently and dispense brewed beverage spaced apart dispensing locations. The apparatus includes a programmable controller apparatus that controls the delivery of the hot water and brewable material, and the operation of the brew groups. In an embodiment, an inline sensor array monitors a quality of the brewed beverage and reports to the programmable controller to maintain a consistent quality brewed product.

15 Claims, 16 Drawing Sheets

(56) References Cited

U.S. PATENT DOCUMENTS

| | | | |
|---|---|---|---|
| 3,385,569 A | | 5/1968 | Bookout |
| 3,410,197 A | * | 11/1968 | Guess .................................. 99/298 |
| 3,671,273 A | | 6/1972 | Gunter |
| D235,009 S | | 4/1975 | Thompson |
| 3,920,299 A | | 11/1975 | Propst |
| D253,953 S | | 1/1980 | Salsbury |
| 4,211,342 A | | 7/1980 | Jamgochian |
| D264,214 S | | 5/1982 | Bowen |
| 4,438,683 A | | 3/1984 | Bartfield |
| 4,468,406 A | * | 8/1984 | d'Alayer de Costemore d'Arc ................................ 426/231 |
| D288,267 S | | 2/1987 | Meyer |
| 4,649,809 A | | 3/1987 | Kanezashi |
| D289,129 S | | 4/1987 | Syverson |
| 4,715,274 A | | 12/1987 | Paoletti |
| 4,797,296 A | | 1/1989 | Meier |
| 4,815,633 A | | 3/1989 | Kondo |
| D302,221 S | | 7/1989 | Suttles |
| 4,873,916 A | | 10/1989 | Piscaer |
| D308,686 S | | 6/1990 | Frost |
| 4,974,500 A | | 12/1990 | Boyd |
| D313,724 S | | 1/1991 | Piñon |
| D316,794 S | | 5/1991 | Volgger |
| 5,033,645 A | | 7/1991 | Shannon |
| D318,973 S | | 8/1991 | Hasslacher |
| 5,056,686 A | | 10/1991 | Jarrett |
| 5,072,660 A | * | 12/1991 | Helbling ............................ 99/280 |
| 5,116,632 A | | 5/1992 | Miller |
| D329,857 S | | 9/1992 | Laituri |
| 5,158,793 A | * | 10/1992 | Helbling ............................ 426/231 |
| 5,207,148 A | | 5/1993 | Anderson |
| D337,475 S | | 7/1993 | Seiffert |
| 5,230,277 A | | 7/1993 | Bianco |
| 5,233,915 A | | 8/1993 | Siccardi |
| D340,611 S | | 10/1993 | Hoover |
| 5,259,297 A | * | 11/1993 | Giuliano ............................. 99/282 |
| 5,303,639 A | | 4/1994 | Bunn |
| 5,309,822 A | | 5/1994 | Sager |
| 5,316,781 A | | 5/1994 | Lüssi |
| D347,755 S | | 6/1994 | Houston |
| 5,341,957 A | | 8/1994 | Sizemore |
| 5,344,050 A | | 9/1994 | Ficken |
| 5,353,692 A | | 10/1994 | Reese |
| 5,393,540 A | | 2/1995 | Bunn |
| D357,062 S | | 4/1995 | Schreiner |
| 5,423,245 A | | 6/1995 | Midden |
| D365,490 S | | 12/1995 | Pomeroy |
| 5,579,678 A | | 12/1996 | Goerndt |
| 5,650,186 A | | 7/1997 | Annoni |
| 5,733,591 A | | 3/1998 | Goerndt |
| D395,975 S | | 7/1998 | Munoz |
| D396,987 S | | 8/1998 | Seiffert |
| D398,432 S | | 9/1998 | Yerkes |
| 5,865,094 A | * | 2/1999 | Kealy ................................. 99/291 |
| 5,911,810 A | | 6/1999 | Kawabata |
| 5,941,163 A | | 8/1999 | Park |
| D413,757 S | | 9/1999 | Viguer Muñoz |
| D414,371 S | | 9/1999 | Seiffert |
| D417,118 S | | 11/1999 | Pomeroy |
| 6,019,032 A | | 2/2000 | Arksey |
| 6,098,524 A | | 8/2000 | Reese |
| 6,099,878 A | | 8/2000 | Arksey |
| 6,135,169 A | | 10/2000 | Sandei |
| 6,182,555 B1 | | 2/2001 | Scheer |
| 6,205,909 B1 | | 3/2001 | Giannelli |
| 6,237,811 B1 | | 5/2001 | Ford |
| D443,398 S | | 6/2001 | Mount |
| 6,240,829 B1 | | 6/2001 | McGarrah |
| D445,292 S | | 7/2001 | Sowden |
| 6,253,664 B1 | | 7/2001 | Giannelli |
| 6,253,667 B1 | | 7/2001 | Lüssi |
| D449,198 S | | 10/2001 | Cahen |
| D455,596 S | | 4/2002 | Boos |
| 6,419,120 B1 | | 7/2002 | Bertone |
| 6,634,280 B2 | | 10/2003 | Sowden |
| D481,901 S | | 11/2003 | Daniels |
| D486,346 S | | 2/2004 | Jönsson |
| 6,726,950 B2 | | 4/2004 | Yuzawa |
| D495,915 S | | 9/2004 | Cahen |
| 6,994,231 B2 | | 2/2006 | Jones |
| 7,021,206 B2 | | 4/2006 | Eckenhausen |
| D527,939 S | | 9/2006 | Smith |
| 7,147,131 B2 | | 12/2006 | Sher |
| D536,204 S | | 2/2007 | Isett |
| D544,287 S | | 6/2007 | Joss |
| D556,493 S | | 12/2007 | Isett |
| 7,322,275 B2 | | 1/2008 | Lüssi |
| 7,507,430 B2 | | 3/2009 | Stearns |
| 7,537,138 B2 | | 5/2009 | Saggin |
| 7,673,555 B2 | | 3/2010 | Nosler |
| 8,247,010 B2 | * | 8/2012 | Nguyen et al. ................. 426/433 |
| 2003/0145736 A1 | | 8/2003 | Green |
| 2004/0168465 A1 | | 9/2004 | Renken |
| 2005/0172833 A1 | | 8/2005 | Ioannone |
| 2006/0034987 A1 | | 2/2006 | Thakur |
| 2007/0119308 A1 | * | 5/2007 | Glucksman et al. ............ 99/275 |
| 2008/0028944 A1 | * | 2/2008 | Webster et al. ................. 99/283 |
| 2009/0158937 A1 | | 6/2009 | Stearns |
| 2010/0030602 A1 | * | 2/2010 | Caswell ............................ 705/7 |
| 2010/0154645 A1 | * | 6/2010 | Nosler et al. .................... 99/281 |
| 2011/0200719 A1 | * | 8/2011 | Rezeki ............................ 426/231 |
| 2011/0212229 A1 | * | 9/2011 | McLaughlin et al. ......... 426/231 |

FOREIGN PATENT DOCUMENTS

| | | | |
|---|---|---|---|
| JP | 2004-046714 | * | 2/2004 |
| JP | 2008-543458 A | | 12/2008 |
| KR | 10-029010 B1 | | 9/1999 |
| KR | 10-2005-0044530 A | | 5/2005 |
| KR | 10-2008-0068664 A | | 7/2008 |
| WO | 2007/027206 A2 | | 3/2007 |
| WO | 2007/035877 A2 | | 3/2007 |

OTHER PUBLICATIONS

International Search Report and Written Opinion mailed Dec. 13, 2011, issued in corresponding International Application No. PCT/US2011/032361, filed Apr. 13, 2011, 8 pages.

* cited by examiner

TABLE 1 - PERFORMANCE MATRIX FOR CURRENT EMBODIMENT

| DRINK SIZE | ONE BREWER | TWO BREWERS | THREE BREWERS |
|---|---|---|---|
| 12 OZ. | 90 DRINKS/HR<br><br>(29 SECONDS FROM DRINK SELECTION TO CUP TAKEAWAY) | 180 DRINKS/HR<br><br>(29 SECONDS FROM DRINK SELECTION TO CUP TAKEAWAY) | 270 DRINKS/HR<br><br>(29 SECONDS FROM DRINK SELECTION TO CUP TAKEAWAY) |
| 16 OZ. | 78 DRINKS/HR<br><br>(35 SECONDS FROM DRINK SELECTION TO CUP TAKEAWAY) | 156 DRINKS/HR<br><br>(35 SECONDS FROM DRINK SELECTION TO CUP TAKEAWAY) | 234 DRINKS/HR<br><br>(35 SECONDS FROM DRINK SELECTION TO CUP TAKEAWAY) |
| 20 OZ. | 69 DRINKS/HR<br><br>(42 SECONDS FROM DRINK SELECTION TO CUP TAKEAWAY) | 138 DRINKS/HR<br><br>(42 SECONDS FROM DRINK SELECTION TO CUP TAKEAWAY) | 207 DRINKS/HR<br><br>(42 SECONDS FROM DRINK SELECTION TO CUP TAKEAWAY) |
| <u>CARAFE</u><br><br>32 OZ.<br>40 OZ.<br>48 OZ. | <br><br>82 SECONDS<br>95 SECONDS<br>128 SECONDS | <br><br>36 SECONDS<br>43 SECONDS<br>82 SECONDS | <br><br>30 SECONDS<br>36 SECONDS<br>36 SECONDS |
| 96 OZ. CONTAINER | 244 SECONDS | 128 SECONDS | 82 SECONDS |

*Fig. 11.*

HIGH SPEED BREWING APPARATUS

CROSS-REFERENCES TO RELATED APPLICATIONS

This application claims the benefit of U.S. Provisional Application No. 61/324,267, filed Apr. 14, 2010, and is a continuation-in part of U.S. application Ser. No. 13/050,852, filed Mar. 17, 2011, which claims the benefit of U.S. Provisional Application No. 61/315,847, filed Mar. 19, 2010, and which is a continuation-in-part of U.S. application Ser. No. 13/038,195, filed Mar. 1, 2011, now U.S. Pat. No. 8,247,010, which claims the benefit of U.S. Provisional Application No. 61/309,401, filed Mar. 1, 2010. The disclosures of these priority patent applications are expressly incorporated herein by reference in their entireties.

BACKGROUND

Coffee preparation, that is, the process of producing a beverage using the coffee bean, typically requires four basic steps be performed: (i) the raw coffee beans are roasted; (ii) the roasted coffee beans are ground; (iii) the ground coffee beans are brewed, i.e., mixed with hot water for a period of time; and (iv) the liquid coffee beverage is separated from the unwanted grounds. Additional steps may include, for example, adding milk, sweetener, flavorings, and/or other additives to the brewed liquid. Typically, in much of the world, the roasted coffee beans are purchased by the user, who then performs the remaining steps. Various coffee brewing systems are known in the art, ranging from personal brewers such as drip coffee makers and French presses, to large commercial systems used for producing a dizzying array of flavored espresso-based beverages.

Ground coffee may be brewed in a number of different ways that may be categorized into four basic methods: (1) boiling, for example placing ground coffee into a cup and pouring hot water over the grounds, allowing the grounds to settle; (2) steeping, for example, placing ground coffee into a French press and waiting a few minutes before depressing the filtered plunger and pouring the brewed liquid into a cup; (3) filtration, for example drip brewing wherein the ground coffee is placed in a filter holder and hot water drips onto the coffee grounds into a carafe or the like; and (4) pressure methods, for making espresso wherein hot water typically between 91° C. and 96° C. is forced under a pressure of between eight and nine atmospheres through a lightly packed matrix or "puck" of finely ground coffee.

The different brewing methods have various disadvantages. For example, boiling and steeping methods require some time, typically 4-7 minutes, to produce an optimally flavored beverage. Filtration methods may be quicker, but do not produce the full bodied coffee that many consumers prefer, and/or may require more coffee grounds to produce an acceptable flavor. Espresso may be relatively quick, but requires relatively high pressures (8-9 atmospheres). Moreover, the high pressures are typically produced by steam, and the relatively high temperatures and pressures produce a very strong and distinctive flavor that some consumers may not prefer.

Similar considerations apply to other brewable beverages, such as teas and the like, which may be similarly brewed.

There is a need, therefore, for a system and method for brewing coffee and other beverages that retains the benefits associated with brewing coffee grounds that are suspended in the heated water, with the rapid brewing associated with pressure brewing methods.

It is important to consumers and producers alike, to be able to produce a consistent, high-quality brewed beverage, for example a coffee beverage. The quality of a brewed coffee depends on a number of different and often related parameters. The quality of a brewed coffee will typically depend on both the amount of coffee soluble components in the brewed liquid, and which of the coffee soluble components are present. If the coffee is under-brewed, for example, certain of the desirable flavor and aroma components may not be obtained from the coffee bean, resulting in an inferior product. Conversely, if the coffee is over-brewed, certain undesirable bitter soluble components may be dissolved in the liquid, again resulting in an inferior product. Conventionally, the quality of a brewed coffee liquid is characterized by measuring the total dissolved solids in the brewed beverage, and determining the percent of available solubles that were extracted from the coffee. However, the rate of extraction is not constant, so prior art quality determinations are made on the final brewed product. It may be difficult or inconvenient to obtain these parameters in the final product, which is typically provided to the end user, and may include flavorings or other additives at the time of dispensing.

A commercial retail vender of beverages, for example a coffee shop, will generally experience regular, relatively brief periods of peak demand. Moreover, during periods of high demand, many customers may be headed to work or have other time constraints such that their ability to wait for the beverage is severely constrained. Therefore, the customer may be forced to forego a desired beverage due to the wait time required, disadvantaging both the customer and the vender.

Also, periodically the vendor or other user may need larger volumes of coffee, such as carafes or higher volume portable containers. Customers may be unwilling to wait for a larger volume of coffee or other beverage to brew, however. Moreover, brewing the large volume demand may interfere with other customers seeking a single serving.

Many venders may attempt to accommodate such peak demand periods by preparing quantities of coffee in anticipation of the high demand. However, this strategy has the disadvantage that the beverage may become stale prior to being served, or may be wasted if the anticipated demand does not materialize. The strategy is also ineffective for accommodating irregular high-demand periods. Conventional coffee brewers require a long time to produce a large quantity of brewed coffee.

For these and additional reasons, it would be beneficial to have a brewing system that is capable of rapidly producing freshly brewed beverage on demand, and capable of producing larger quantities of brewed beverage in a reasonable amount of time.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A brew group for a beverage brewing system is disclosed that includes a brewing chamber, for example a block having a cylindrical aperture therethrough, a lower piston assembly that slidably engages a bottom end of the cylindrical aperture, and an upper piston assembly that is configured to slidably engage the upper end of the cylindrical aperture. A first actuator is operable to move the lower piston assembly longitudinally through the cylindrical aperture, and a second actuator is operable to move the upper piston assembly between a load position and a brewing position. In the load position the upper piston assembly is disposed above the cylindrical aperture and pivoted away. In the brewing position the upper piston sealingly engages the cylindrical aperture. A sliding arm assembly is disposed on the upper surface, and is hingedly attached to a third actuator that is configured to slide the assembly over the upper surface of the brewing chamber.

A brewing system is disclosed that includes a source of brewable product, for example ground coffee or tea, a source of heated water, and a brewing chamber for brewing the product in the heated water. An electronic system is provided for controlling the operation of the brewing system, preferably including a computer processor, communications facilities, and related data storage ability. The system further includes an inline sensor positioned to intercept the fluid stream expelled from the brewing chamber, and to measure a one or more properties of the fluid stream, wherein the sensor generated time-dependent data corresponding to the measured property or properties. For example, the sensor may measure the total dissolved solids in the brewed liquid. The data is communicated to the controller, which may use the data to continuously or periodically adjust the brewing parameters, for example, by adjusting the grinder time to adjust the amount of brewable product received into the brewing chamber.

A brewing system is disclosed having a plurality of brew groups that are operable either independently or in a ganged mode, to produce a large quantity of freshly brewed beverage very rapidly. In independent mode the freshly brewed beverage is delivered in individual servings, and in ganged mode the brew groups cooperate to rapidly produce a larger quantity of brewed beverage, for example to fill a carafe or larger container.

In an embodiment the brewing system includes a programmable controller apparatus, which may include one controller for each brew group. In ganged mode, one of the controllers operates as a master to control the operation of the other slaved controllers. One or more hot water reservoirs deliver hot water to the brew groups, and a brewable product dispenser, for example one or more coffee hoppers and grinders, deliver brewable product to the brew groups. The hot water reservoir and brewable product dispenser are controlled by the programmable controller apparatus. In ganged mode the plurality of brew groups dispense brewed beverage at a common dispensing location, and in independent mode the plurality of brew groups dispense brewed beverage it individual, spaced apart dispensing locations.

In an embodiment, the programmable controller includes a processing unit, a memory module, a data input port, and a control signal generator.

In an embodiment, each of the brew groups include a brewing chamber, a first piston assembly that sealingly engages one end of the brewing chamber, and a second piston assembly that is movable between a brew position and a load position. The brew groups are preferable configured to operate at a brewing pressure between 10 psi and 100 psi.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 11 shows a table for an exemplary system, and illustrating the relative production performance of a single-brew group system, a two-brew group system, and a three-brew group system.

DETAILED DESCRIPTION

Figure 1:
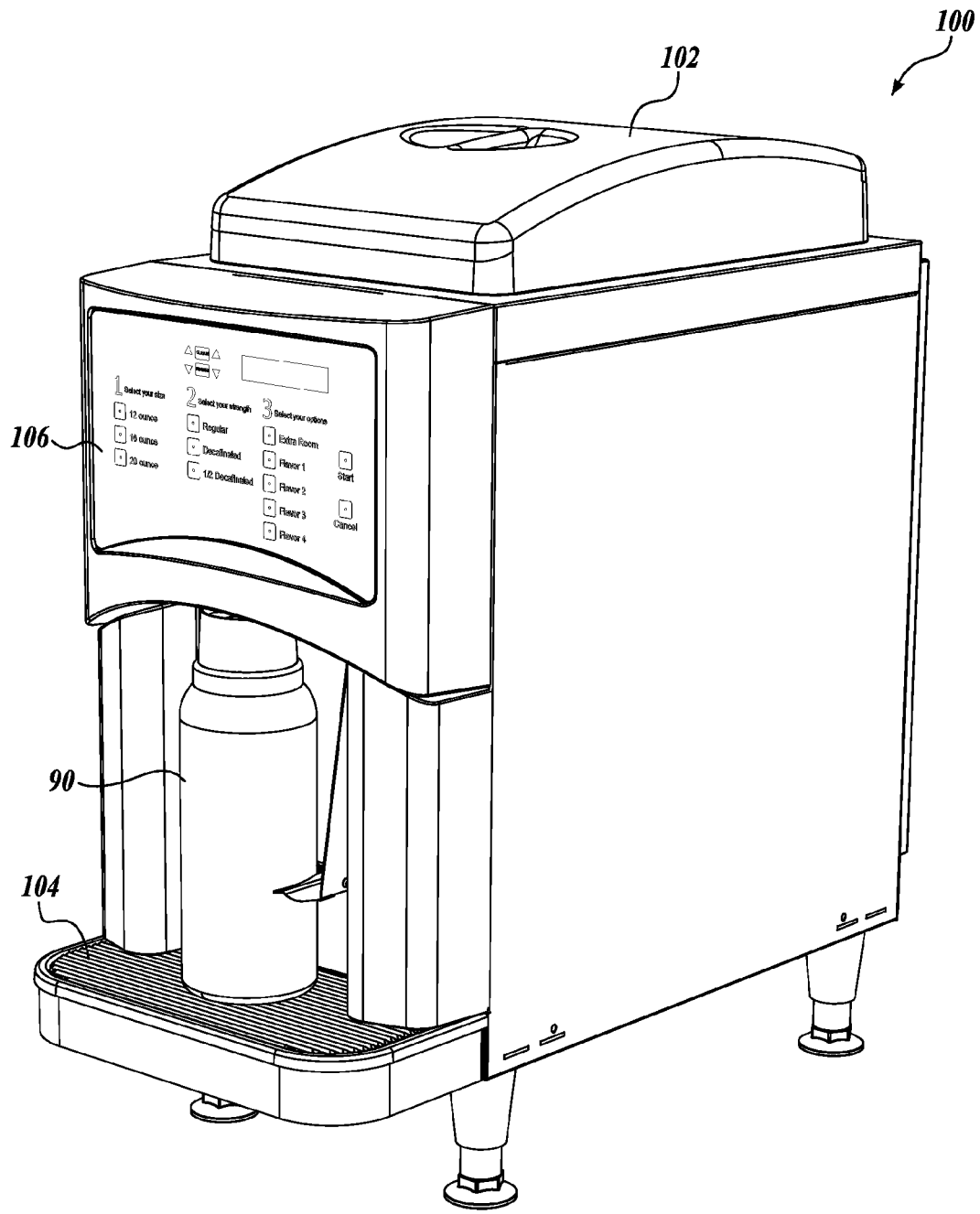
FIG. 1 is a front-right perspective environmental view of a beverage brewing system in accordance with the present invention.

A particular embodiment of a brewing system in accordance with the present invention will now be described with reference to the figures, wherein like numbers indicate like parts. One or more of the present inventors is also an inventor for related and co-pending U.S. patent application Ser. No. 13/038,195, filed on Mar. 1, 2011, the disclosure of which is hereby incorporated by reference, in its entirety. FIG. 1 shows a perspective environmental view of a brewing system 100 in accordance with the present invention, having a hopper 102 disposed at a top of the system 100, and holding a carafe 90 in the dispensing area 104. A beverage selection panel or control panel 106 is shown generally above the dispensing area 104. It is contemplated that the hopper 102 may define a plurality of selectable compartments containing different brewable materials, for example different types or species of coffee beans. For example, the beverage selection panel 106 may give users the option to select a beverage size (e.g., 12, 16, or 20 ounces), among beverage choices (e.g., regular coffee, decaffeinated coffee, tea), and/or among flavoring or other additive options (e.g., creamer, sweetener, syrup flavors). The beverage selection panel 106 may also allow selection of a parameter of the brewed beverage (e.g., strength), and/or provide feedback regarding a measured quality of the brewed beverage.

The brewing system 100 may be suitable for brewing various brewable materials, such as ground coffee, tea, or the like. Although the following discussion refers specifically to coffee brewing systems in places, it will be understood that the teachings of the present invention may similarly be applied to other brewing systems, including tea brewing systems.

Figure 2:
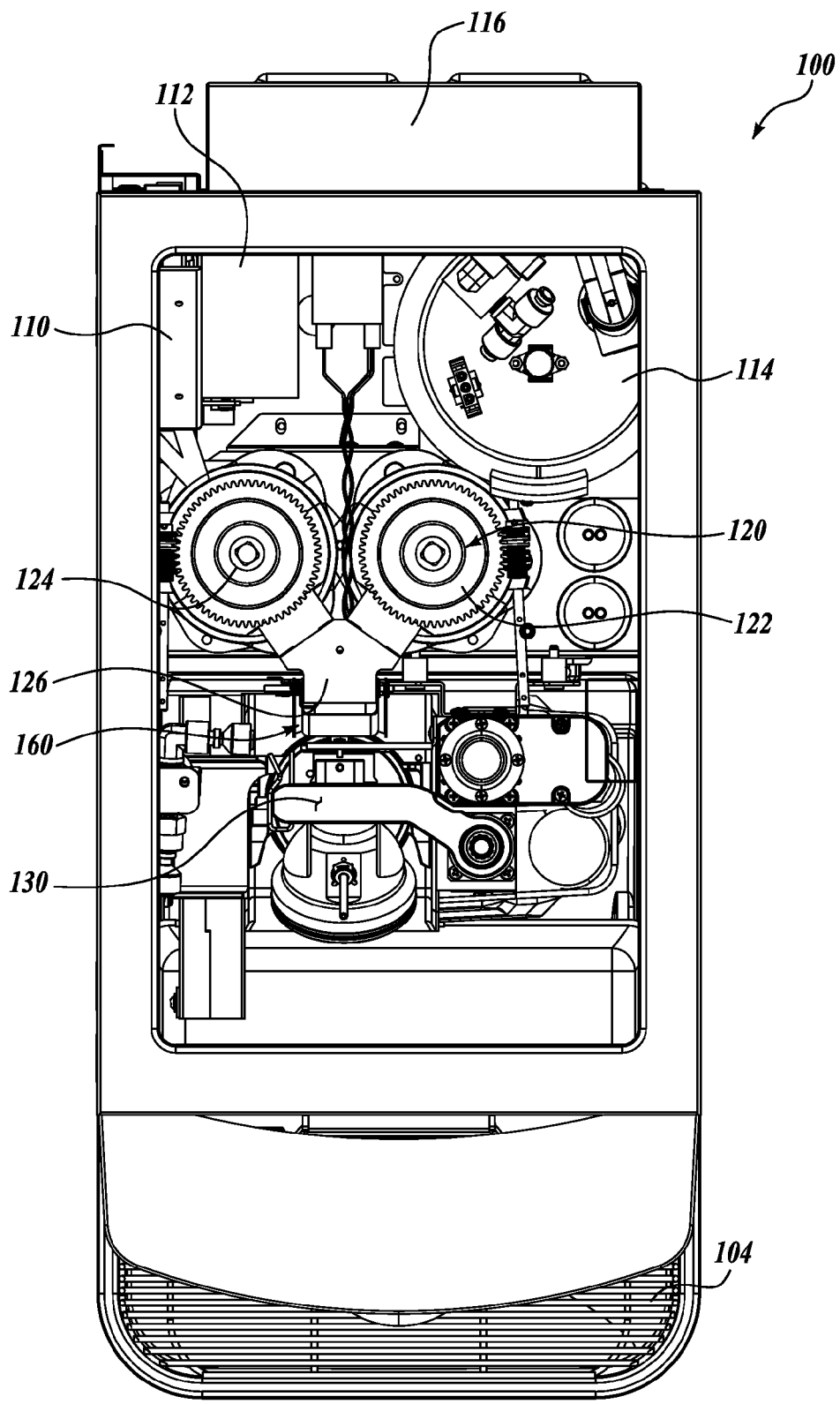
FIG. 2 is a plan view of the beverage brewing system shown in FIG. 1, with some outer panels removed to expose interior components.

FIG. 2 shows a top view of the brewing system 100 with the hopper 102 and certain other portions removed to expose internal components. In this embodiment the brewing system 100 includes a brew group controller 110, a power supply 112, an optional flavoring controller 116 and a water heater/ reservoir 114. A grinder assembly 120 comprising two grinders 122, 124 is positioned to receive product, for example coffee beans, from the hopper 102. The brewable product from the grinder assembly 120 is expelled through a shared chute base 126, and a chute assembly 160.

Figure 3:
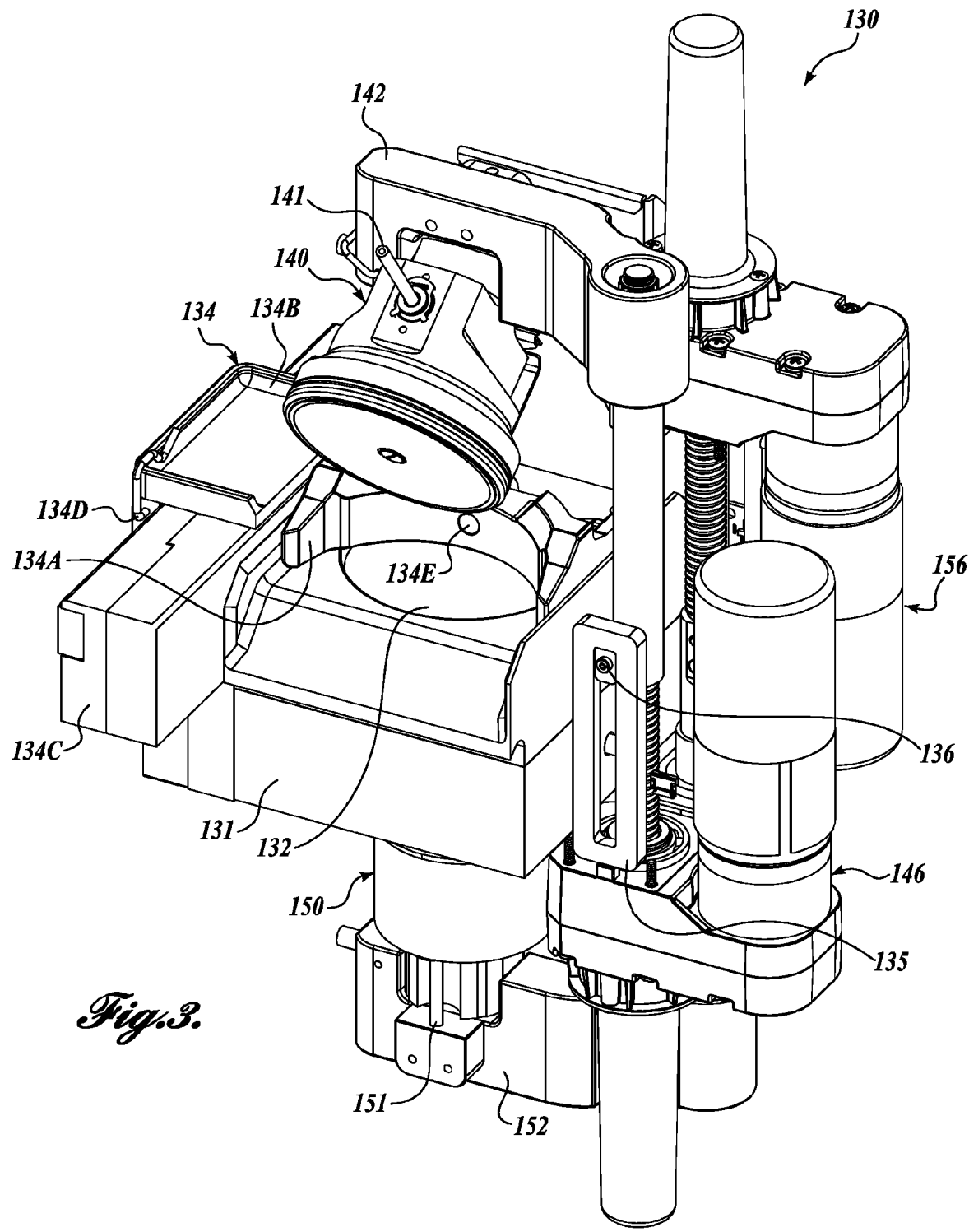
FIG. 3 is a perspective view showing the brew group for the beverage brewing system shown in FIG. 1.

A brew group 130, shown in more detail in FIG. 3, is plumbed to receive hot water from the reservoir 114 and configured to receive brewable product from the grinding assembly 120. The brew group 130 includes a cylindrical brewing chamber 132, currently formed with a cylindrical sleeve disposed in a block assembly 131. The brewing chamber 132 is positioned to receive coffee grounds from the grinder assembly 120. In a currently preferred embodiment the brewing chamber defines a cylindrical volume between 2 inches and 3.5 inches in diameter, and a height between 2.5 inches and 5.0 inches. However, the brew group including brewing chamber 132 may readily be scaled to other sizes.

A sliding arm assembly 134 is slidably disposed over the brewing chamber 132, and is configured to push spent grounds or other brewed material off of the block assembly 131. In this embodiment the sliding arm assembly 134 includes a C-shaped arm 134A that extends across the width of the brewing chamber 132. The lower transverse edges of the C-shaped arm 134A are beveled. The arm 134A is drivably attached to a drive arm subassembly 134B. The drive arm subassembly 134B is movable linearly by an actuator 134C such that the C-shaped arm 134A is controllably movable across the upper surface of the block assembly 131. In the current embodiment, the actuator 134C comprises an electric motor-driven worm gear system with a toothed belt (not shown) that drivably engages the drive arm subassembly 134B.

Although not required for the present invention, the actuator 134C, and the piston actuators discussed below, are preferably configured with encoders (not shown) to enable precise positioning of the various elements. In a current embodiment rotational sensors/encoders are provided on the drive motors, and linear sensors/encoders are provided on the drive shafts, to enable precise positional control. Exemplary sensors are Hall-effect sensors with magnets.

A novel aspect of the illustrated sliding arm assembly 134 is the flexibility of the assembly, which provides a very reliable and effective mechanism for removing spent coffee grounds, as discussed below. In particular, the drive arm subassembly 134B slides along an upper surface of the actuator 134C, and includes a spring-loaded hinged connection 134D. A portion of the drive arm subassembly 134B extends behind the C-shaped arm 134A and is connected thereto with a pivot 134E. The flexibility of the sliding arm assembly 134 provides a very reliable mechanism for scraping spent grounds from the block assembly 131.

The brew group 130 includes an upper piston assembly 140 that is pivotably attached to an upper support arm 142, which is attached to a first linear actuator 146. The upper piston assembly 140 is movable between a load position (shown in FIG. 3) and a brewing position wherein the upper piston assembly 140 sealingly engage the brewing chamber 132 from an open top end of the chamber 132. The upper piston assembly 140 includes a dispensing tube 141 that dispenses the brewed beverage. The upper piston assembly 140 is described in more detail below.

The brew group 130 further includes a lower piston assembly 150 that is pivotably attached to a lower support arm 152, which is pivotably attached to a second linear actuator 156. The lower piston assembly 150 is sized and configured to sealingly engage the brewing chamber 132 from an open bottom end of the chamber 132, and includes a water supply tube 151.

The first and second linear actuators 146, 156 further include a guide slot 135 and anti-rotation pin 136 (only one anti-rotation device 135, 136 visible in FIG. 3) to assure the corresponding piston moves only longitudinally.

Figure 4:
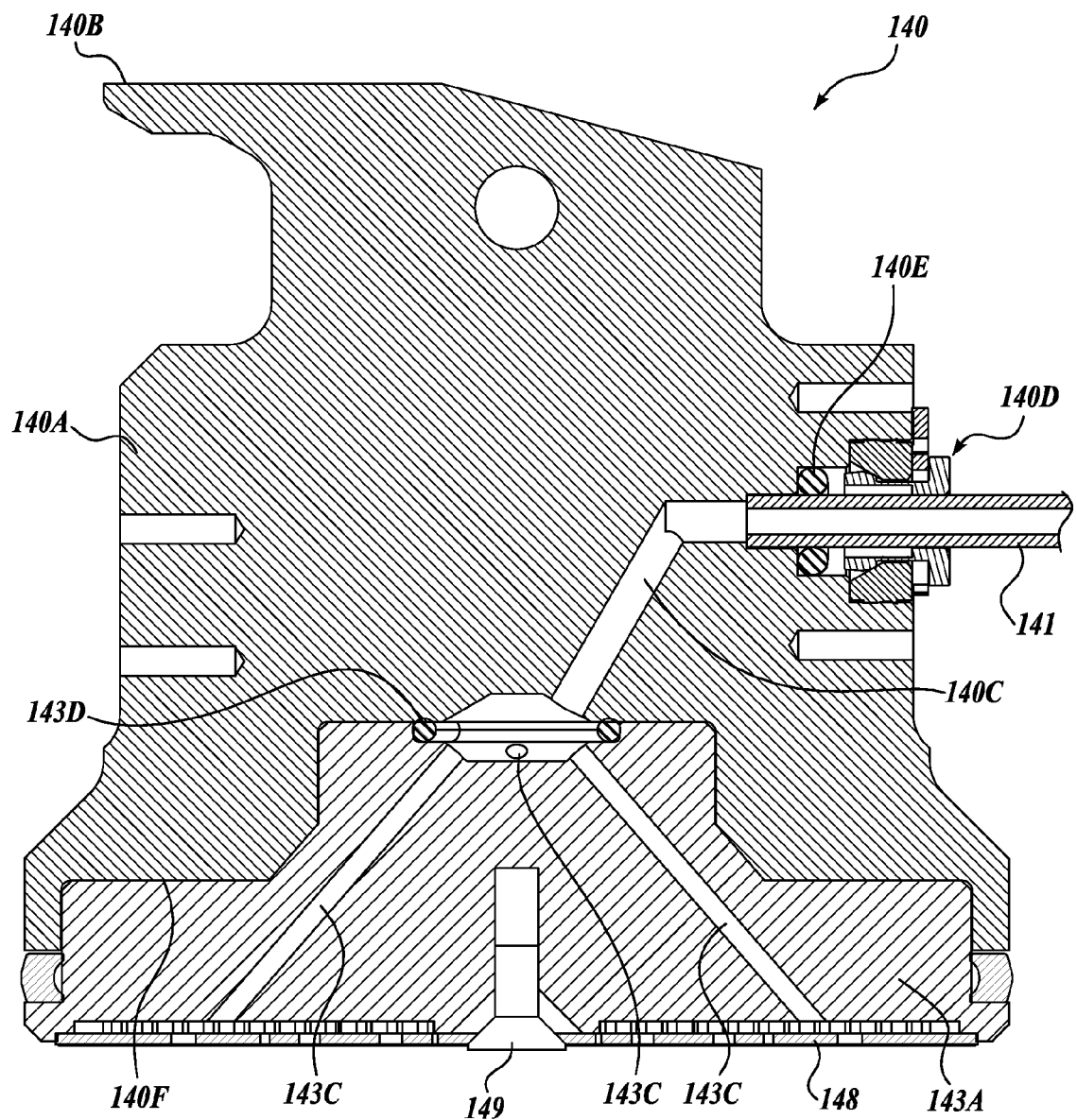
FIG. 4 is a section view of the upper piston assembly shown in FIG. 3.

FIG. 4 shows a cross section of the upper piston assembly 140. The upper piston assembly 140 defines a piston having a first piston member 140A that is configured to pivotably attach to the upper support arm 142, and includes a fixed lever arm 140B to facilitate pivoting the piston assembly 140. A channel 140C is defined from a front face of the first piston member 140A and extending to a lower face. The dispensing tube 141 is attached to the first piston member 140A with a half-cartridge fitting 140D and O-ring 140E, to fluidly and sealingly engage the channel 140C. A shaped recess 140F defines the lower face of the first piston member 140A.

A second piston member 143A is configured to nest with and engage the shaped recess 140F. A plurality of channels 143C extend through the second piston member 143A and fluidly engage the channel 140C in the first piston member 140A. An O-ring 143D is provided to seal the connection between the channel 140C and the plurality of channels 143C. The channels 140C, 143C therefore cooperatively define a plurality of fluid paths that extend from the lower face of the second piston member 143A to the dispensing tube 141. A perforated plate 148 is removably attached to the bottom face of the second piston member 143A with a fastener 149.

Figure 5:
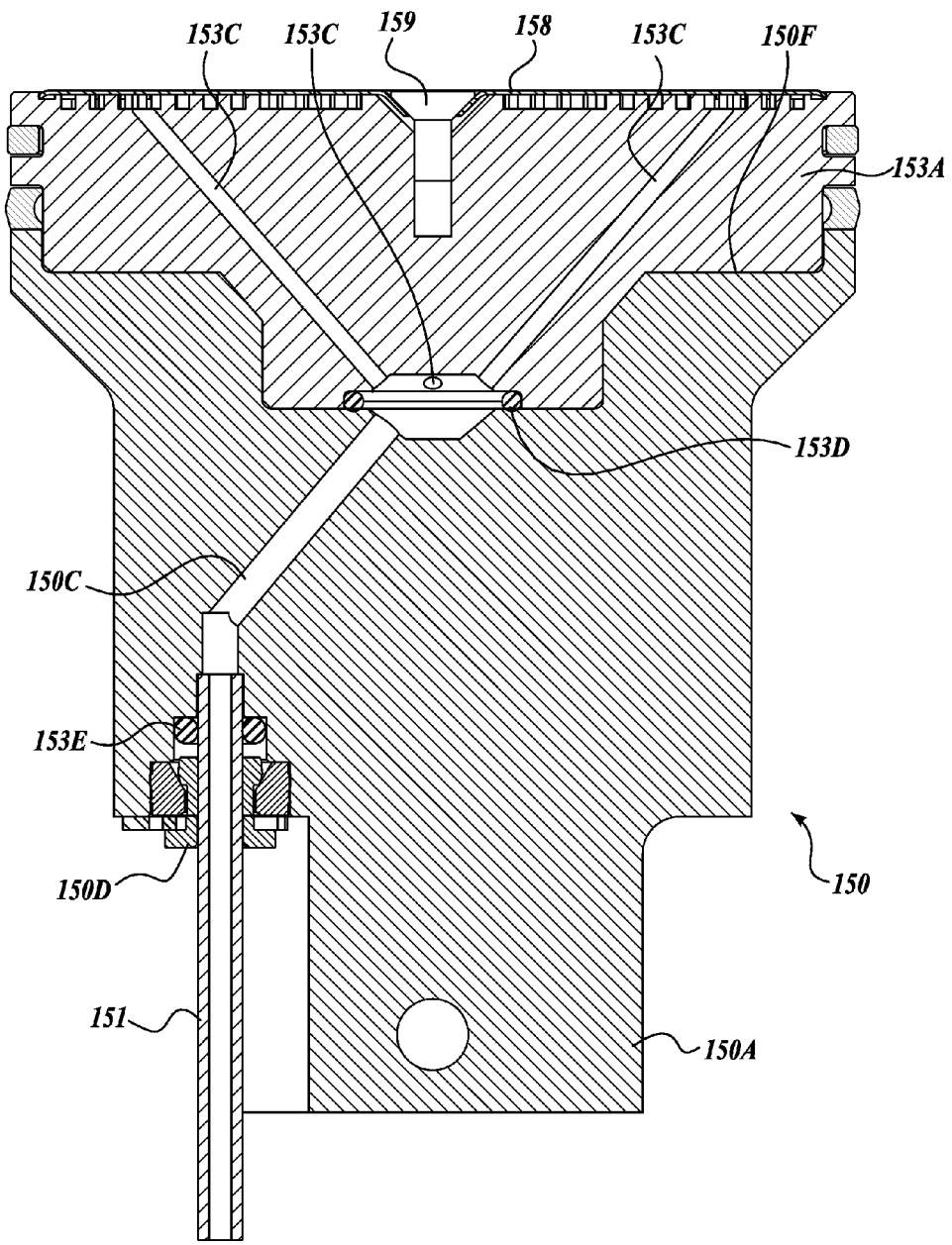
FIG. 5 is a section view of the lower piston assembly shown in FIG. 3.

FIG. 5 shows a section view of the lower piston assembly 150. The lower piston assembly 150 includes a first piston member 150A configured to attach to the lower support arm 152. A channel 150C extends from a lower opening in the first piston member 150A to an upper face. The water supply tube 151 is attached to the first piston member 150A with a half-cartridge fitting 150D and O-ring 150E to fluidly and sealingly engage the channel 150C. A shaped recess 150F defines the lower face of the first piston member 150A.

A second piston member 153A is configured to nest with and engage the shaped recess 150F, and is removably attached thereto. A plurality of channels 153C extend through the second piston member 153A and fluidly engage the channel 150C in the first piston member 150A. An O-ring 153D is provided to seal the connection. The channels 150C, 153C therefore cooperatively define a plurality of flow paths that extend from the water supply tube 151 to the upper face of the second piston member 153A. A perforated plate 158 is removably attached to the second piston member 153A with a fastener 159.

The operation of the brew group 130 will now be described with reference to FIGS. 6A-6E, which illustrate the brew group 130 in isolation with a portion of the brew chamber 132 cut away, at various stations in the brew cycle. It is contemplated that the operation of the components of the brewing system 100 will be automatically controlled by the controller 110 and related systems, in response to the specific beverage request entered by a user from the beverage selection panel 106. Alternate means for entering a beverage request are also contemplated, for example using remote beverage entering system that is in signal communication with the brewing system 100, wirelessly (e.g., using RF, Bluetooth®, or the like) or using a card reading system, or the like.

Figure 6A:
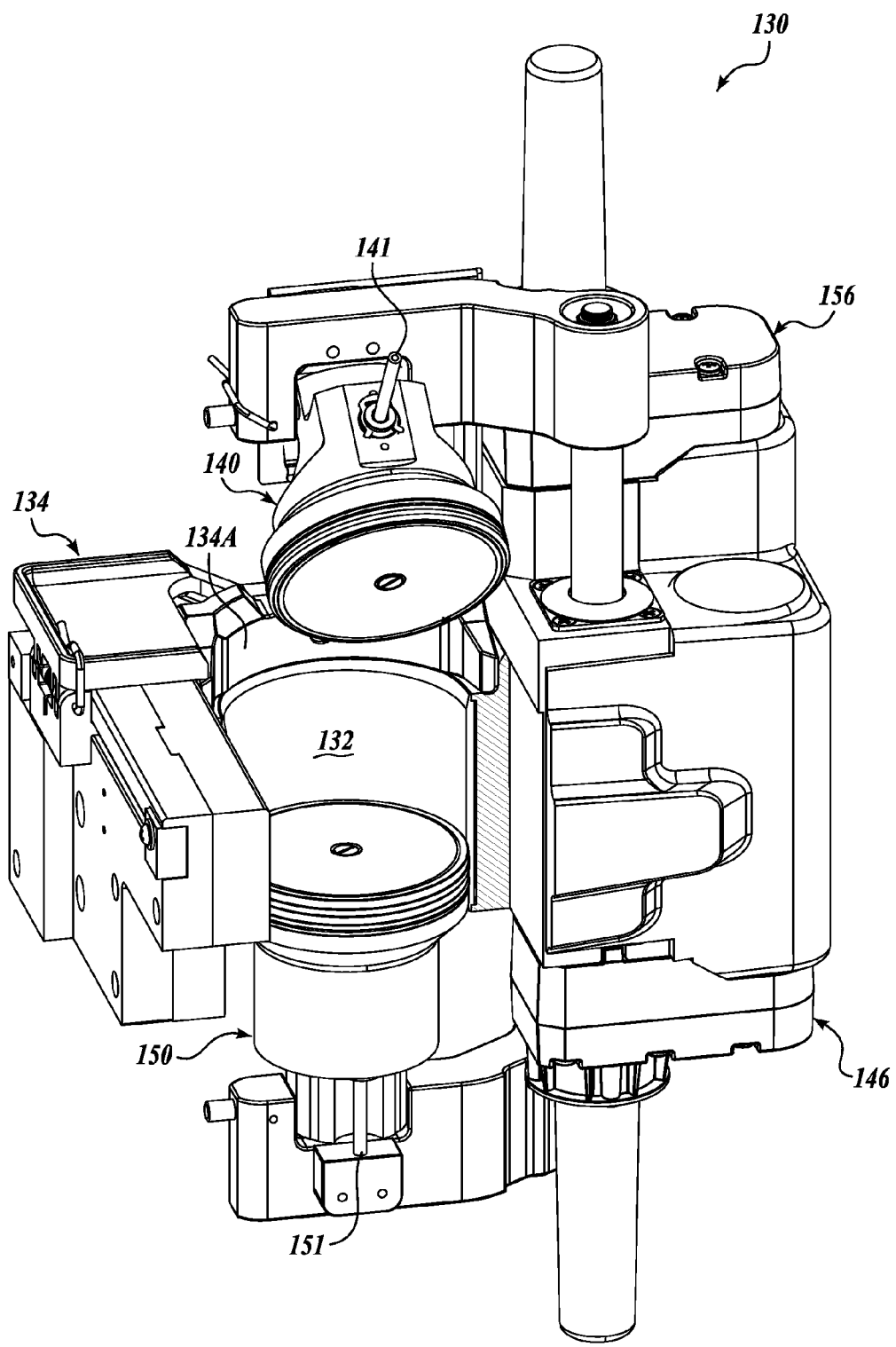
FIGS. 6A, 6B, 6C, 6D, and 6E illustrate the brew group shown in FIG. 3 with the brewing chamber partially cut away, in various positions during the brewing cycle.

FIG. 6A shows the brew group 130 in position to receive brewable material, for example ground coffee from the grinder assembly 130. The lower piston assembly 150 sealingly engages the brewing chamber 132, positioned near the lower end of the chamber 132 by the second linear actuator 156. The upper piston assembly 140 is positioned upwardly away from the brewing chamber 132 by the first linear actuator 146, and pivoted to the load position. Brewable material from the grinder assembly 120 is received into the brewing chamber 132.

Figure 6B:
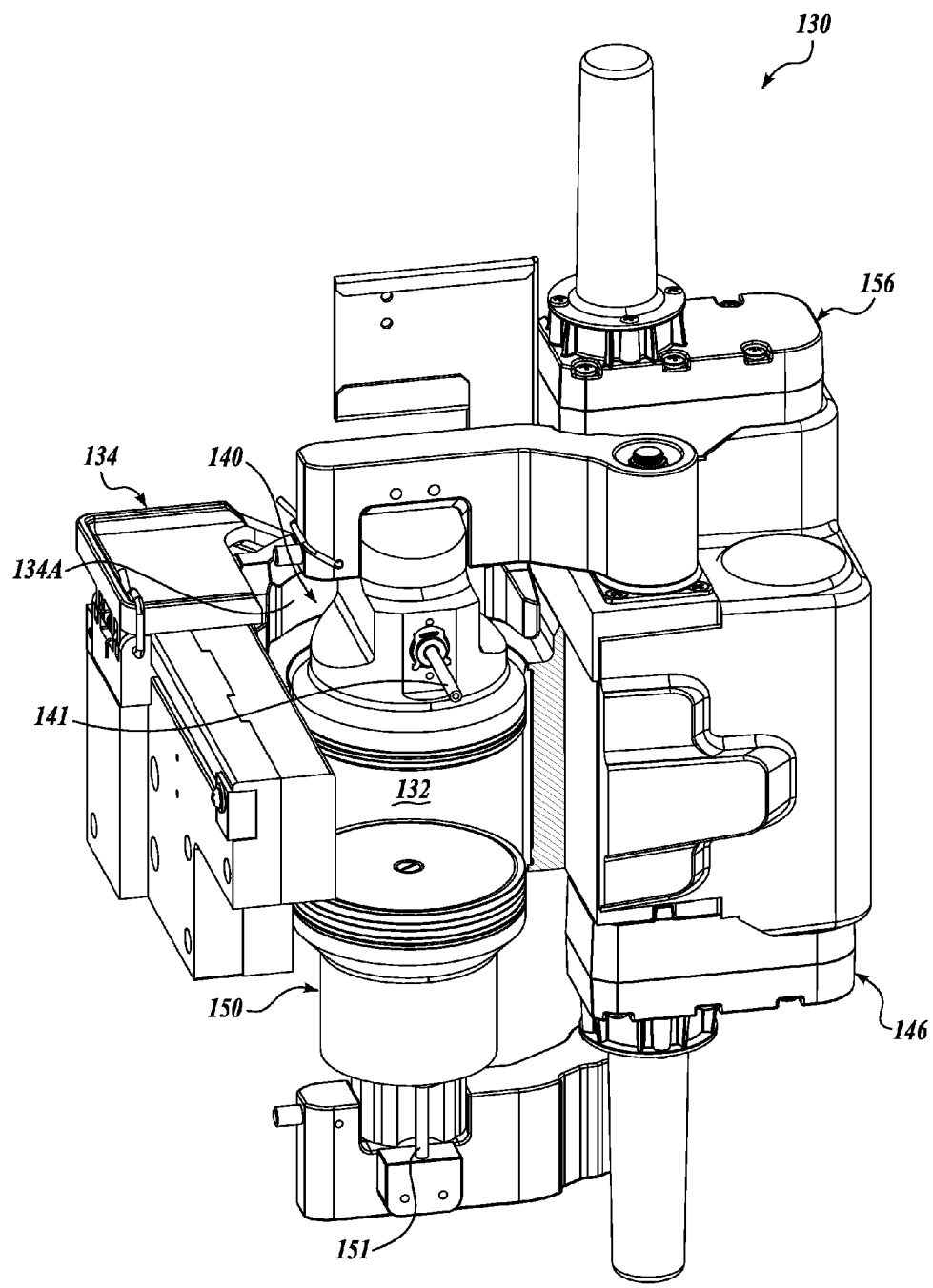

As illustrated in FIG. 6B, the upper piston assembly 140 is moved to the brewing position to sealingly engage an upper end of the brewing chamber 132. As the upper piston assembly 140 is moved downwardly, it pivots to a vertical orientation or brew position. It is contemplated that the vertical position of the lower piston assembly 150 may also be adjusted, for example to accommodate the selected beverage size. For example, if a "small" or "8-ounce" beverage was selected, the lower piston assembly 150 may be moved upwardly in the brewing chamber 132. Valves (not shown) are positioned to close liquid egress from the brewing chamber 132, and to fluidly connect the heated water reservoir 114 to the water supply tube 151. This initiates the flow of hot water through the lower piston assembly 150 and into the brewing chamber 132. Preferably the water pressure is maintained at a desired value to optimize brewing quality and/or speed. Preferably a nominal pressure in the range between 10 and 100 psig is maintained, and more preferably in the range of 20-60 psig for coffee or in the range of 10-50 psig for other brewable product such as tea.

When the desired amount of water and the desired pressure has been provided, the water supply may optionally be stopped to provide a desired time for brewing. It will be appreciated by persons of skill in the art that the pressurized brewing chamber 132, although lower in pressure than espresso makers, will nevertheless accelerate the brewing process as compared to prior art systems wherein the brewing chamber is not pressurized. In the current embodiment, the pressurized water supply from the heater/reservoir is regulated to provide a desired pressure. It is contemplated that the regulated pressure may be between 10 and 100 psig.

In a first embodiment or mode of operation of the system 100, the water flow is resumed (or maintained) and a dispensing valve (not shown) is opened to initiate the flow of brewed beverage through the upper piston assembly channels 140C, 143C to the dispensing tube 141, and then ultimately dispensed to the cup, carafe, or other container 90. In an alternative second mode of operation, the lower piston assembly 150 is moved upwardly through the brewing chamber 132, to cause the brewed liquid flow through the upper piston assembly 140 and to the dispensing tube 141.

Figure 6C:
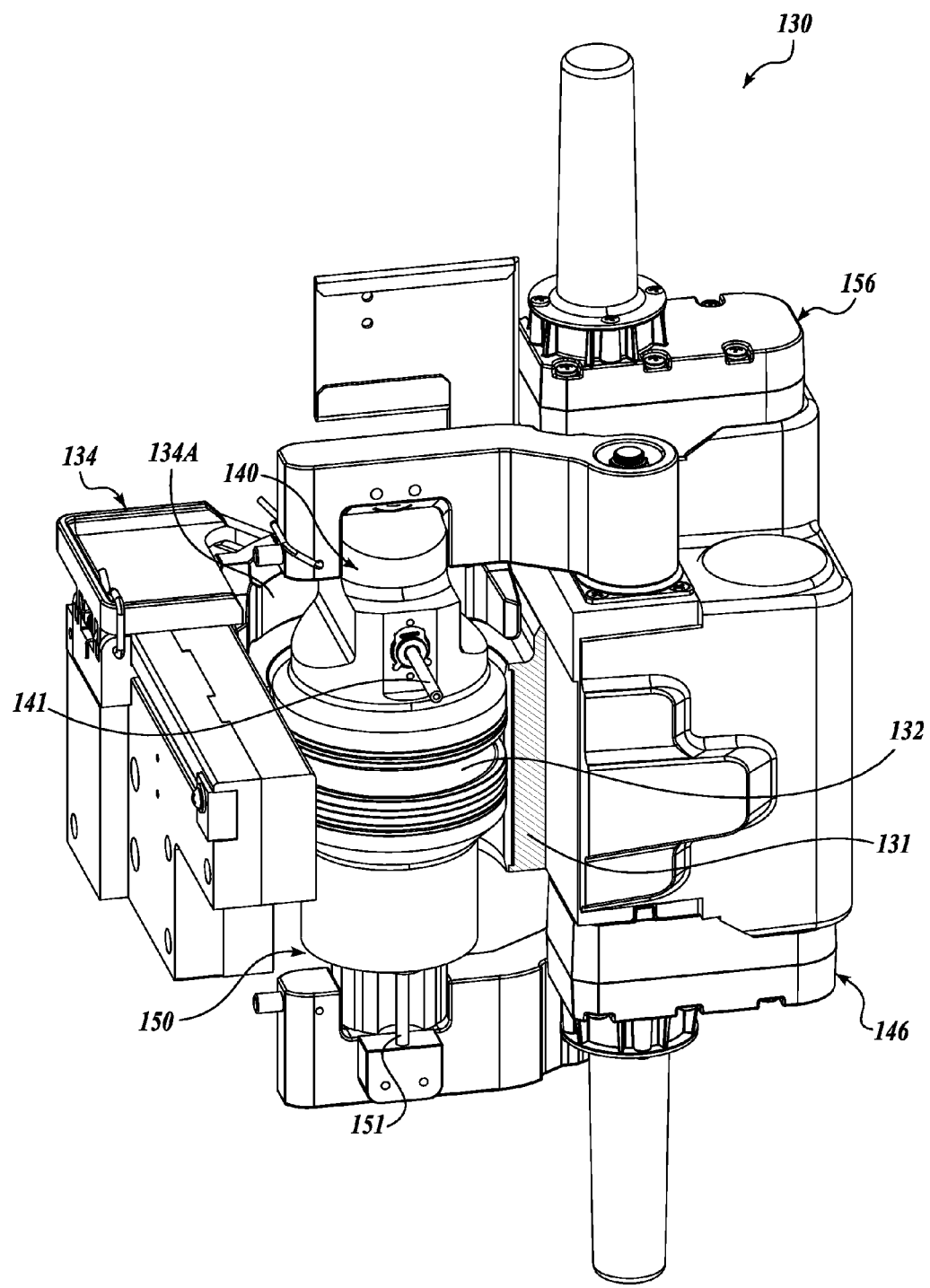

FIG. 6C shows the brew group 130 wherein the lower piston assembly 150 has been moved upwardly part way through brewing chamber 132. In the first mode of operation, one or more valves (not shown) redirect the flow to a drain that is preferably plumbed into the system 100. In the second mode of operation, the upward movement of the lower piston assembly 150 dispenses the brewed liquid to the carafe of other container. In either case, the now spent brewed material is compressed between the upper piston assembly 140 and the lower piston assembly 150, such that a significant portion of the water is removed.

Figure 6D:
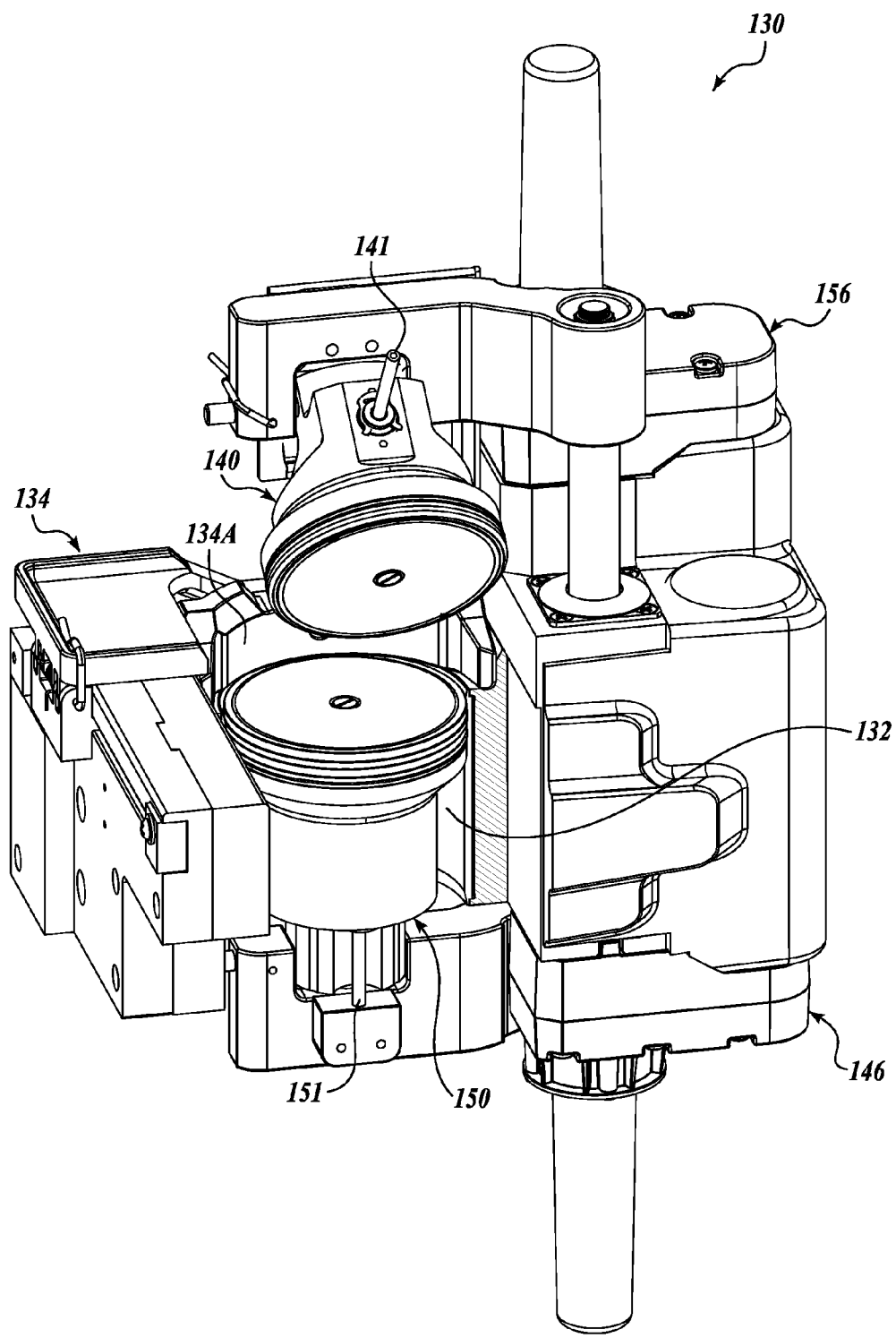

Referring now to FIG. 6D, the upper piston assembly 140 is moved upwardly to disengage from the brewing chamber 132 and pivots to the load position. The lower piston assembly 150 is moved upwardly such that the lower piston is approximately flush with the upper surface of the block assembly 131. The compressed spent grounds are therefore positioned to be removed, and the upper piston assembly 140 is moved out of the way of the sliding arm assembly 134.

Figure 6E:
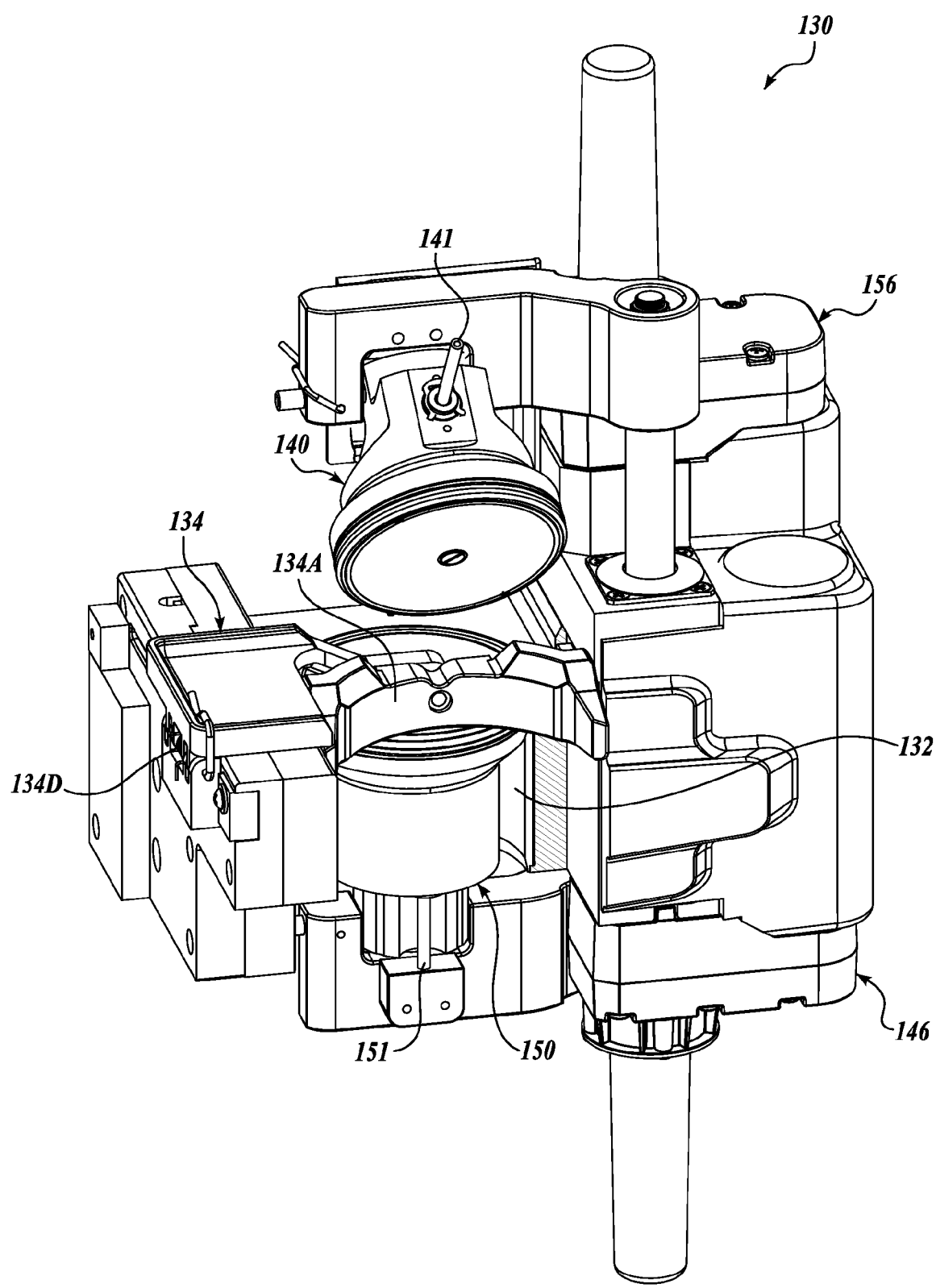

FIG. 6E shows the sliding arm assembly 134 after sliding the C-shaped arm 134A over the brewing chamber 132 to remove the spent grounds. The system 100 may include an internal repository or chute for the spent grounds, or may be positioned over an external repository positioned to receive the grounds. The sliding arm assembly 134 may then be retracted, to return to the ready position shown in FIG. 6A.

From the above description, it will be appreciated that the currently preferred system provides for a liquid flow through the brewing chamber 132 that is initiated with heated water entering through the lower piston assembly 150 at the bottom of the brewing chamber 132, and brewed liquid exiting through the upper piston assembly 140. Although not preferred, it will be apparent to persons of skill in the art that with straightforward changes, the present invention may be practiced with the liquid flow proceeding in the opposite direction.

Figure 7:
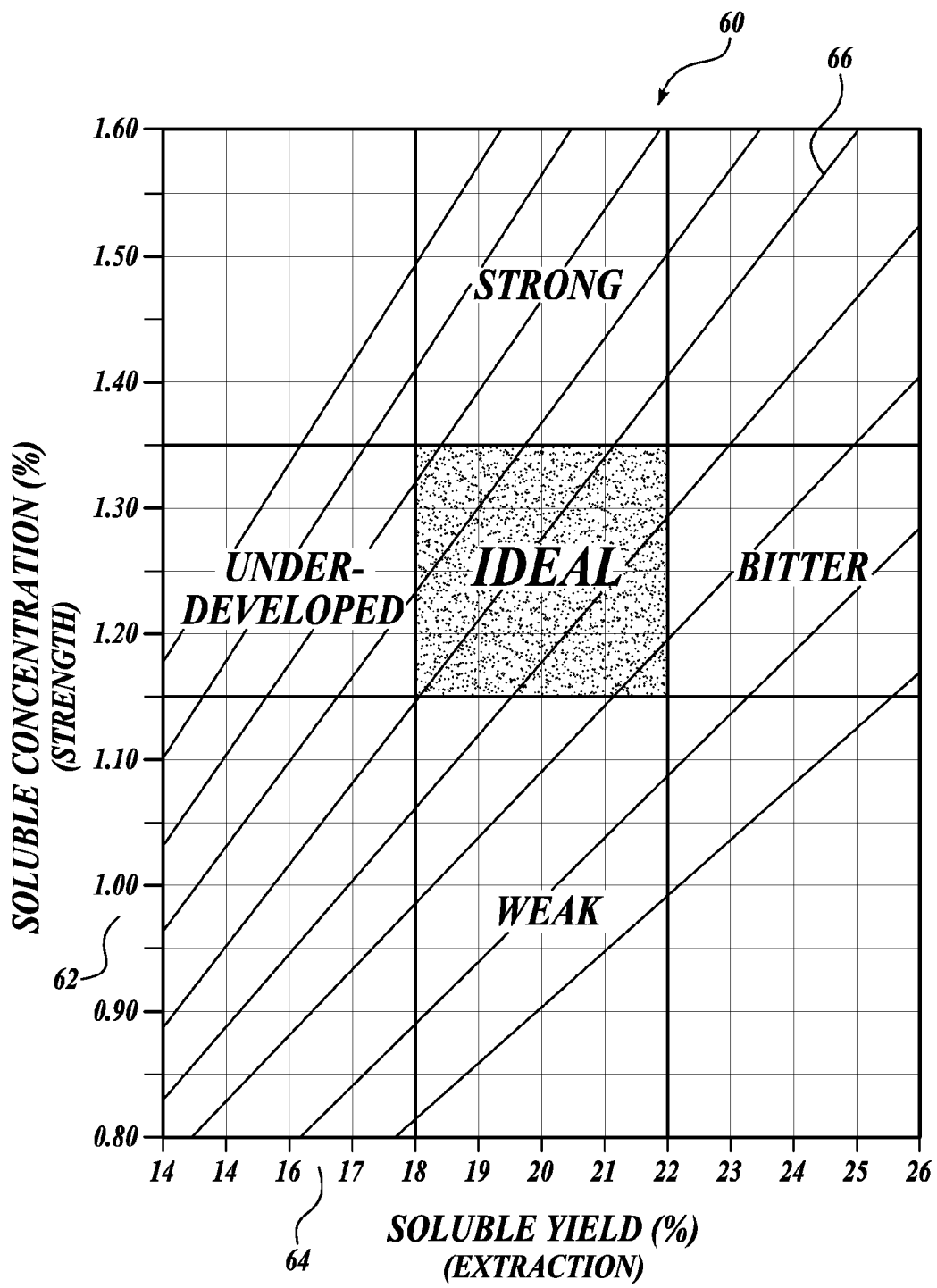
FIG. 7 illustrates the Coffee Brewing Control Chart.

FIG. 7 shows a conventional Coffee Brewing Control Chart 60, attributed to Dr. E. E. Lockhart. The Control Chart 60 relates the soluble concentration or strength 62 in a brewed coffee liquid (a measure of the total dissolved solids in the liquid) to the soluble yield or extraction 64 from the coffee that generated the coffee liquid. Under this Control Chart, a coffee liquid having less than 1.15% soluble concentration will have a "Weak" flavor, and coffee having greater than 1.35% soluble concentration will have a "Strong" flavor. If less than 18% of the solubles are extracted from the brewed coffee then the flavor of the coffee liquid will be "Underdeveloped," but if more than 22% of the solubles are extracted from the brewed coffee then the flavor will be "Bitter." Therefore, the Control Chart defines an "Ideal" flavor region within these bounds. The diagonal curves indicate particular "brewing formulas," i.e., the ratio of ground coffee (e.g., in ounces) to water brewed (e.g., in gallons). The line 66, for example, corresponds to a ratio of 7.5 ounces of coffee to one gallon of water. Lines to the right and below line 66 indicate progressively lower coffee-to-water ratio formulae, and lines to the left and above line 66 indicate progressively higher coffee-to-water ratio formulae.

Therefore, if the brewing formula is known, and the total dissolved solids ("TDS") in the brewed liquid is known, the beverage location on the on the Control Chart 60 can be precisely determined. It should be appreciated that the Control Chart provides a guideline for producing a high quality coffee beverage, and that the preferred coffee liquid strength and extraction parameters are not necessarily in the center of the "Ideal" box in the Control Chart. In practice, it may be desirable to determine the strength and extraction parameters that are optimal for a particular coffee blend, e.g., a preferred location on the Control Chart 60, and then to control the brewing cycle parameters to target those optimal values. It will also be appreciated that personal preferences may differ. For example, one person may prefer a beverage that is nearer the top of the "Ideal" box, whereas another user may prefer a beverage relatively lower in the "Ideal" box.

It will be appreciated, as alluded to above, that the strength and extraction of a brewed beverage may be controlled or modified through different parameters in the brewing process, for example by adjusting one or more of (i) the coffee to water formula, (ii) the brewing time, (iii) the water temperature, (iv) the water pressure, (v) the grind size, etc. The optimal strength and extraction targets will also generally be dependent on the particular blend or brand of coffee. Although the Control Chart 60 is specifically directed to brewing coffee, it is contemplated that very similar methods may be used to characterize the quality of other brewed liquids, for example particular teas.

One difficulty in using the Control Chart 60 in an automated brewing system such as the system 100, is that the strength or TDS in the brewed liquid in the Control Chart is the final or batch value at the end of the brewing cycle. This batch value is typically inconvenient or difficult to obtain.

Figure 8:
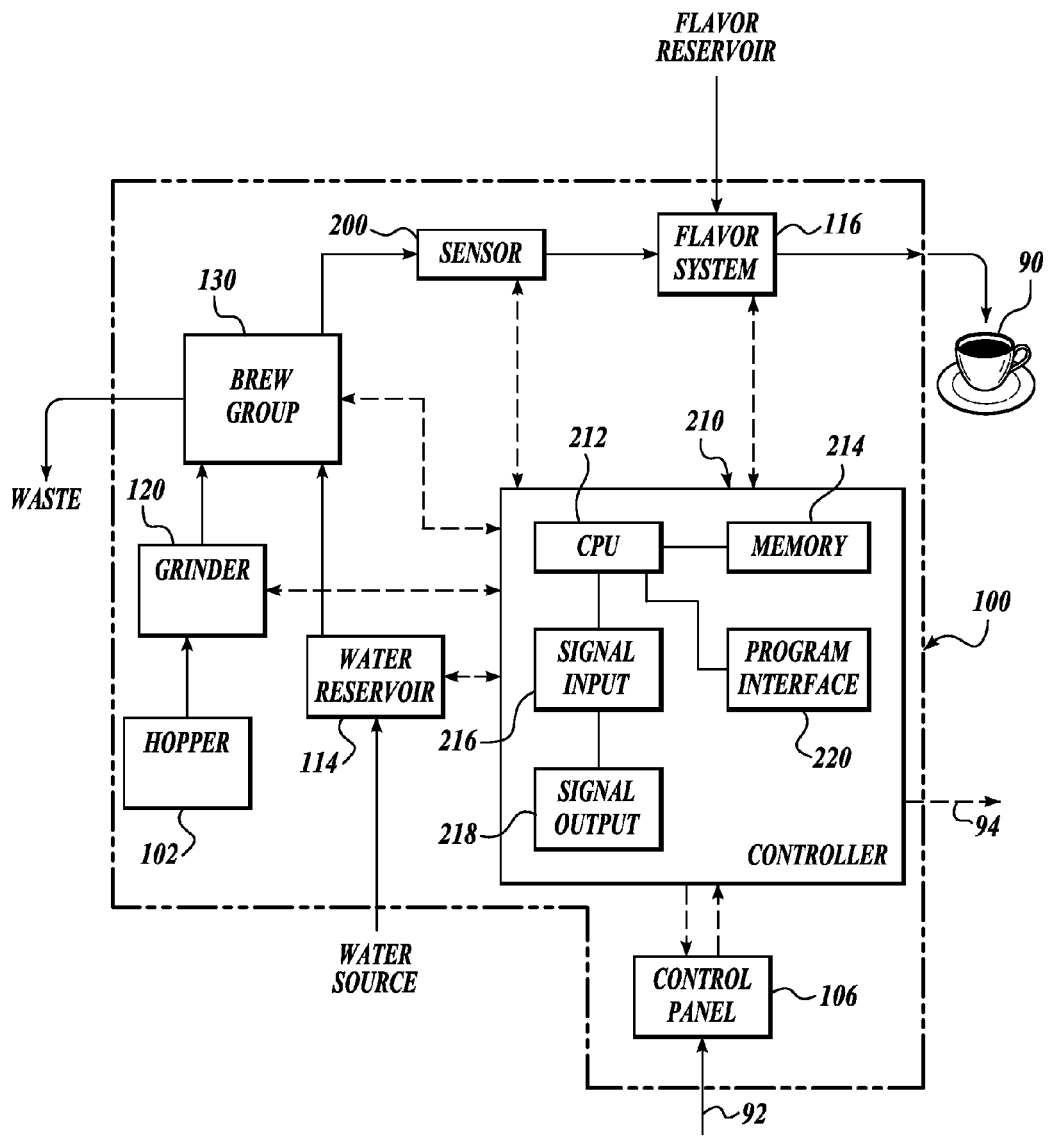
FIG. 8 is a simplified block diagram of the brewing system shown in FIG. 1.

FIG. 8 illustrates a simplified block diagram of the brewing system 100, showing the user input 92 beverage selection panel 106, hopper 102, water reservoir 114, grinder assembly 120, brew group 130, and optional flavoring system 116 described above. An inline sensor or sensor array 200 is fluidly connected to the dispensing tube 141, such that the brewed liquid flows by or through the sensor array 200. (As used herein, a sensor array may include a single sensor or a plurality of sensors.) The sensor array 200 measures properties of the brewed liquid at a particular inline location along the flow path, as the brewed liquid flows from the brew group 130 towards the dispensing container 90. The sensor array 200, therefore, will produce a time-dependent output showing the measured property of the liquid stream as it flows by the sensor array 200. In a current embodiment the sensor array 200 is located along the fluid path shortly downstream of the brew group 130, although other locations are also contemplated, including at the brewed liquid dispensing station.

The sensing array 200 provides specific data regarding qualities of the brewed liquid that may be used, for example, to monitor the quality of the beverage. The data provides feedback that may be used to initially configure particular settings of the system 100, and/or to monitor each brew to provide feedback that may be used to adjust brew parameters to maintain optimal product quality.

A controller 210, which in this embodiment includes a programmable processor 212, a memory module 214, a plurality of data input ports 216, a control signal generator 218, and a program interface module 220, is in signal communication with the sensor array 200. The controller 210 may additionally be in signal communication with other components of the brewing system, as indicted by the dashed lines in FIG. 8.

The sensor array 200 produces unsteady or time-dependent signals preferably over the entire period that the brewed liquid passes through or by the sensor array 200. The signals represent a measured property of the brewed liquid. The unsteady signals are transmitted to the controller 210. Additional data may also be transmitted to the controller 210, for example data from other system components such as the grinder 120, water supply 114, etc. For example, temperature sensors (e.g., a brewing chamber temperature thermocouple) may provide information that is useful for interpreting data from the sensor array 200. Similarly, the current grinder setting may be transmitted to the controller 210.

In a particular embodiment external data may also be provided to the controller 210. For example, the coffee blend and/or brand may be provided using a reader (e.g., barcode or RF system, etc.) that obtains data from coffee packaging, and transmits the data to the controller 210.

The controller 210 processes the received data and uses the data to generate control signals to adjust one or more brewing parameters to achieve a desired and consistent brew quality. For example, the grind time (i.e., quantity of ground coffee), grind size, hot water temperature, brewing pressure, and brew time are all potentially adjustable parameters.

The controller 210 may further include a communications port 94, for example with wired or wireless connection to a network (not shown), such that sensor array 200 data and related information (e.g., TDS/strength, brewing formula, extraction, etc.) and the state of various brew parameters may be reported out. For example, the quality of each brewed beverage (e.g., strength and extraction) may be reported and recorded, to verify that the desired quality is consistently maintained in the "gold cup" box of FIG. 7.

The disclosed apparatus and method is new and unique in that it describes, for a beverage dispensing system, a method and apparatus to sense and measure the continually varying time-based signature of physical characteristics in the brewed liquid stream. The resulting signature provides: a) a means for predicting the end-item in-the-cup beverage quality; b) a means for monitoring in-process beverage production and means of adjustment, or correction of beverage quality; c) a means for monitoring system 100 performance and maintenance needs; d) a means for protecting brand integrity, such as with a coffee roaster or gourmet tea producer; and e) a means for providing system 100 calibration, either manually, or automatically.

It is contemplated that one or more visible and non-visible light wavelength sensors, along with temperature sensors in several locations may be used to provide both means for monitoring beverage properties, e.g., temperature. In particular, one or more near-infrared sensors have been found useful. Other suitable sensors contemplated include acoustic sensors.

Multiple sensors of the same type, for example, two near-infrared sensors, can be employed in the array to provide redundancy and improved signal-to-noise characteristics. Additionally, if multiple visible light sensors are employed, they may, or may not, be of the same wavelength, if it is desired to observe different brew-stream characteristics. In its current embodiment, temperature sensors are also placed to monitor the equipment temperatures, such as the brew chamber 132.

For example, the present method may include the following steps:

1) The brewed liquid stream is configured to pass through, or by, the sensor array 200.

2) The system electronics capture the output of the sensor array 200.

3) The time-based signature is then analyzed and/or correlated, via signature comparison, numerical algorithm, look-up table, or the like, to known, or desired, beverage quality standards (such as a refractometer or total dissolved solids) for the end-batch.

Additional features and advantages of particular embodiments of the present invention include:

a. Prediction of in-the-cup beverage quality to the consumer. The brewing system 100 provides a means for verifying that a consistent "Gold Cup" standard beverage or the like has been produced, and may be configured to transmit results from the sensor array 200 to alert others if maintenance is required, for example.

b. Enables in-process monitoring and means of adjustment to maintain in-cup-beverage quality. Comparing the signature and/or analysis results and making adjustments, such as adding more ground coffee, or adjusting coffee grinders 130, temperature, etc., to obtain the "Gold Cup" coffee beverage consistently.

c. Enables pro-active means for establishing system 100 maintenance needs.

d. Protection of Brand Integrity. A high-value brand utilizing the present system 100, with their various coffee roasts, each having a unique brew-stream signature. The system 100 will be able to determine if other brands, or lesser-quality coffee products were substituted, and appropriate action could take place, such as shutting down of the system 100.

e. Enable self-calibration of system 100 when different product, such as different coffee roast, or blend, is introduced.

Figure 9:
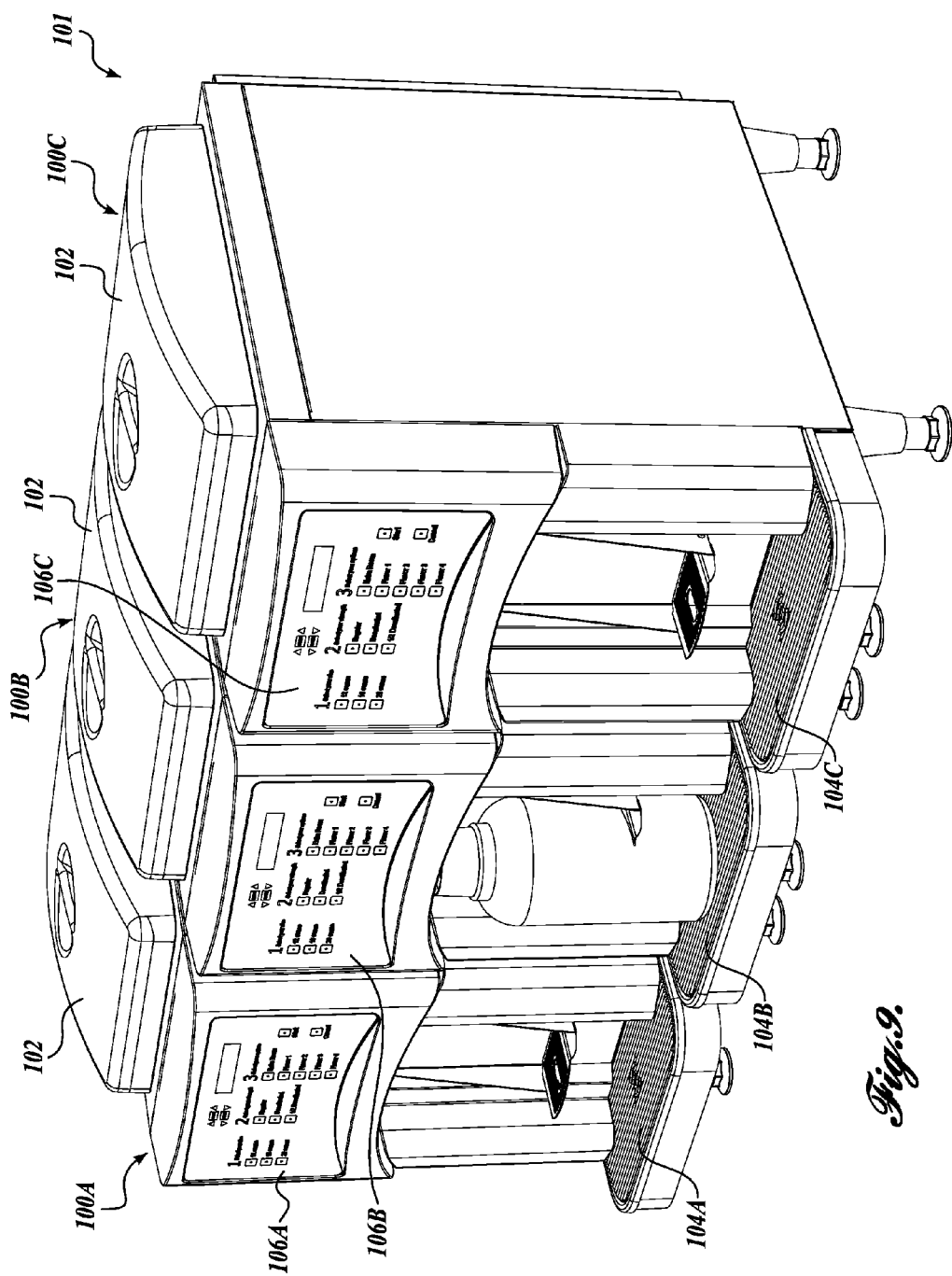
FIG. 9 illustrates a ganged multi-brewer system comprising three brewing assemblies configured to be operable independently or in a coordinated or ganged mode, in accordance with the present invention.

In another aspect of the present invention, it is contemplated that multiple brew groups 130 may be ganged to selectively cooperate to facilitate the production of a brewed beverage, while retaining the flexibility to efficiently produce individual servings of the brewed beverage. As discussed above, to timely accommodate periods of peak demand for coffee A ganged multi-brewer system 101 in accordance with the present invention is illustrated in FIG. 9. The illustrated multi-brewer system 101 includes three brewing systems 100A, 100B, 100C, that are configured to be operable either in an independent mode, or in a master/slave ganged mode. More or fewer brewing systems may alternatively be provided. In a current embodiment the brewing systems are modularly designed such that the same brewing systems may be alternatively configured to operate in different numbers.

In the present embodiment the three brewing systems 100A, 100B, 100C are substantially similar to the brewing system 100 described above. The description of the common aspects of these brewing systems will not be repeated here, in order to focus on the novel aspects of the ganged configuration. However, it will be appreciated that the ganged aspect of the present invention is not limited to brewing system of this type, and the teachings herein will readily enable persons of ordinary skill in the art to modify other brewing systems to be ganged and operable in a coordinated mode, as discussed below.

Figure 10:
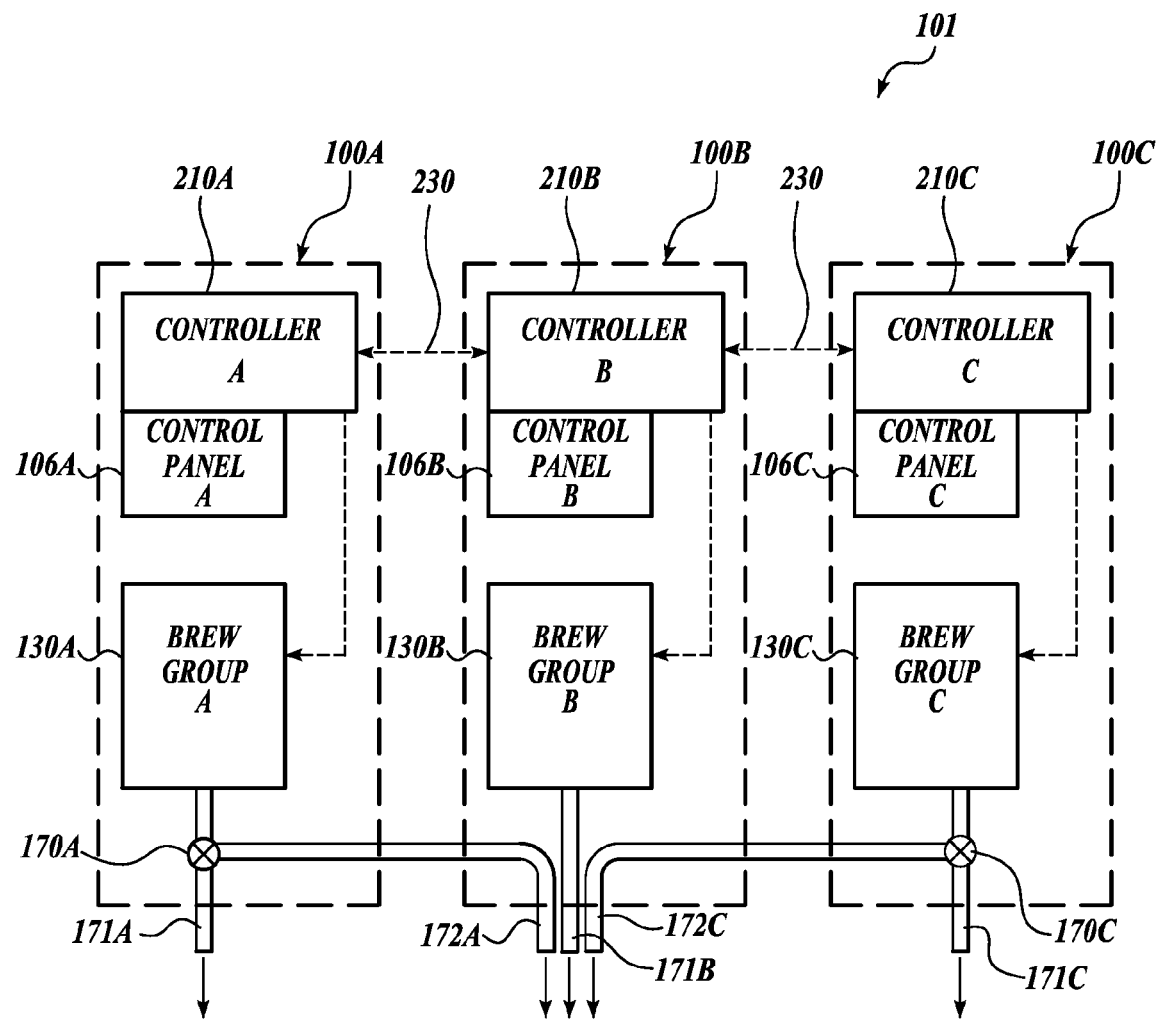
FIG. 10 illustrates schematically the ganged multi-brewer system shown in FIG. 9.

FIG. 10 illustrates schematically the multi-brewer system 101, with certain components such at the hopper, grinder, etc., not show for clarity. The individual brewing systems 100A, 100B, and 100C include corresponding programmable controllers 210A, 210B, 210C that may include all of the elements for the controller 210 shown in FIG. 8, and as described above. The controllers 210A, 210B, 210C control the brew groups 130A, 130B, 130C, respectively. The controllers 210A, 210B, 210C, are in signal communication as indicated by arrows 230, which may be accomplished, for example, with cable connections therebetween, or by wireless communication. In independent mode, each of the three brewing systems 100A, 100B, and 100C is controlled independently by the associated controller 210A, 210B, 210C. To that end, each brewing system includes an associated control panel 106A, 106B, 106C, and associated dispensing area 104A, 104B, 104C. Of course, having three independent brewing systems 100A, 100B, and 100C would provide a retail coffee shop great flexibility in accommodating demand.

However, the brewing systems 100A, 100B, 100C are also configured to be operable in a coordinated or ganged mode. For example, the control panel 106B may include a switch to select between independent mode and ganged mode. In ganged mode controller 210B acts as a master controller and controllers 210A and 210C are slaved to the master controller 210B, such that the operation of all three brewing systems 100A, 100B, 100C are controlled by the controller 210B.

The brewing systems 100A and 100C each include a controllable valve 170A and 170C, disposed upstream of the dispensing tubes 171A, 171C. The valves 170A, 170C are operable to divert the brewed beverage through a corresponding diverting dispensing tube 172A, 172C having an outlet that is near or adjacent the dispensing tube 171B of the master brewing system 100B. Although it is currently preferred to have separate dispensing tubes 172A, 172C for ease of assembly and cleaning, it is also contemplated by the present invention that the dispensing tubes 172A, 172C may be configured and plumbed to provide flow into and upstream of the master brewing system 100B dispending tube 171B.

It will now be appreciated that the ganged brewing systems 100A, 100B, 100C, operating in ganged mode cooperatively produce a relatively high volume flow at the master brewing system 100B dispensing area 104B (FIG. 9). As described above, the brew groups 130A, 130B, 130C produce a fresh brewed beverage.

In a particular embodiment, the ganged brewer systems 100A, 100B, and 100C are modularly designed and are essentially identical in construction. In this particular design, the brewer systems 100A, 100B, and 100C are interconnected through the dispensing tubes 172A and 172C, and the controllers 210A, 210B, 210C are placed in signal communication, with the controller 210B established as the master controller, and controllers 210A and 201C establishes as slave controllers, for ganged operation.

FIG. 11 is a performance matrix for the multi-brewer system as described above, and showing the performance for corresponding one-brewer, two-brewer, and three-brewer systems. The individual brewing systems 100A, 100B, 100C in this embodiment are capable of producing ninety 12-ounce, seventy-eight 16-ounce, or sixty-nine 20-ounce beverages per hour. For individual beverages, the brewers are operated independently, and therefore two brewers can produce twice as many beverages as one brewer, and three brewers can produce three times as many beverages as a single brewer.

As discussed above with reference to FIGS. 6A-6E, after brewing the beverage, the brew groups 130 eject excess fluids and the grounds, before returning to the position to begin the next beverage. Therefore, the time from the drink selection to cup takeaway (i.e., the time the user experiences when brewing a beverage) is significantly less than the cycle time for the brew group 130. As also discussed above, the current brew groups 130 brew the beverage under pressure, e.g., between 10 and 100 psi, which reduces the time required to consistently produce the desired "gold cup" quality beverage. Currently, the brew groups 130A, 130B, 130C may produce a 12-ounce beverage in 29 seconds, a 16-ounce beverage in 35 seconds, and a 20-ounce beverage in 42 seconds.

When producing larger quantities of brewed beverage, the present system 101 enables very rapid production. With a single brewer system, a 32-ounce carafe may be filled in 82 seconds, and a 48-ounce carafe may be filled in 128 seconds. A 96-ounce carrier may take 244 seconds to fill. With two brew groups working cooperatively the 32-ounce carafe may be filled in 36 seconds and the 96-ounce container may be filled in 128 seconds. With three brew groups working cooperatively a 32-ounce carafe may be filed on 30 seconds, and a 96-ounce container may be filled on only 82 seconds. Other performance results are shown in FIG. 11.

Figure 12:
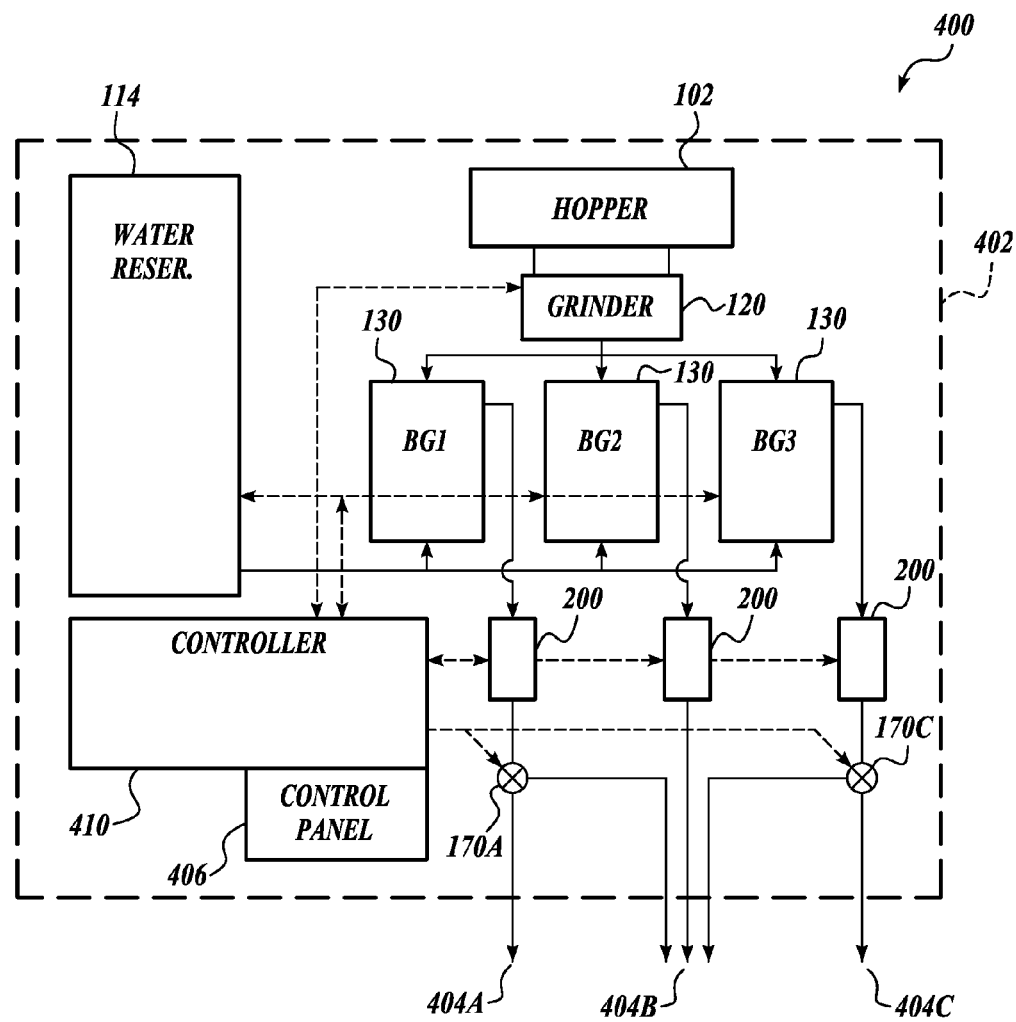
FIG. 12 illustrates schematically a second embodiment of a gangable multi-brewer system in accordance with the present invention wherein multiple brew groups are disposed in a single enclosure, and share other brewing components.

FIG. 12 illustrates schematically another multi-brewer system 400 in accordance with the present invention. The multi-brewer system 400 is similar to the multi-brewer system shown in FIGS. 9 and 10, except that the multiple brew groups 130 are interconnected and disposed within a single enclosure 402, and share a single controller 410 similar to the controller 210 described above that directly controls each of the brew groups 130. The controller 410 is preferably in signal communication with other components of the brewing system, as indicted by the dashed lines in FIG. 12. A single control panel 406 is used to provide user input to the system 400. The multi-brewer system 400 may also use a single control panel 106 to receive user input 92, and a single hopper 102, grinder assembly 120, and/or water heater/reservoir 114. In this embodiment, the fluid streams exiting each of the brew groups 130 is monitored by separate inline sensor arrays 200, which are in signal communication with the controller.

The advantages of the multi-brewer system 400 include compactness, fewer components, and lower cost. Controllable valves 170A, 170C enable the brew groups 130 to dispense either at individual dispensing areas 404A, 404B, 404C, or to all dispense at the same dispensing area 404B.

It will be appreciated that this multi-brewer systems described above provides a high-speed multi-brewer capability, such that high volume requirements (e.g., filling carafes or other high volume containers) can be accomplished quickly, while also providing great flexibility for producing a variety of selectively, individually brewed beverages in non-master/slave operating mode. It is contemplated that more or fewer than three brewers may be provided in a single system.

While illustrative embodiments have been illustrated and described, it will be appreciated that various changes can be made therein without departing from the spirit and scope of the invention.

The embodiments of the invention in which an exclusive property or privilege is claimed are defined as follows:

1. A beverage brewing system comprising:
   a programmable controller apparatus;
   a plurality of brew groups, each brew group operable to brew a beverage in response to commands received from the controller apparatus;
   a hot water reservoir operable to deliver hot water to at least one of the plurality of brew groups in response to commands received from the controller apparatus;
   a brewable product hopper operable to dispense brewable product to at least one of the plurality of brew groups in response to commands received from the controller apparatus;
   wherein the plurality of brew groups are operable in a ganged mode in which the plurality of brew groups dispense brewed beverage at a common dispensing location, and in an independent mode in which the plurality of brew groups dispense brewed beverage at spaced apart dispensing locations.

2. The beverage brewing system of claim 1, wherein the programmable controller apparatus comprises a plurality of interconnected controllers, each controller associated with one of the plurality of brew groups, wherein the plurality of interconnected controllers are operable in either (i) the independent mode wherein each controller controls the associated brew group independently, and (2) the ganged mode wherein one of the plurality of interconnected controllers controls the remaining of the plurality of interconnected controllers.

3. The beverage brewing system of claim 2, wherein the plurality of interconnected controllers each comprise a processing unit, a memory module, a data input port, and a control signal generator.

4. The beverage brewing system of claim 2, wherein the plurality of brew groups each comprise a brewing chamber having an open first end and an open second end, a first piston assembly that sealingly engages the first end of the brewing chamber, and a second piston assembly that is movable between a brew position wherein the second piston assembly sealingly engages the second end of the brewing chamber and a load position wherein the second piston assembly is disposed away from the second end of the brewing chamber.

5. The beverage brewing system of claim 2, wherein the plurality of brew groups are operable to brew the brewed beverage at a pressure between 10 psi and 100 psi.

6. The beverage brewing system of claim 2, wherein at least one of the plurality of brew groups further comprises a dispensing flow path that includes a controllable valve such that brewed beverage can be controllable redirected from a first dispensing tube to a second dispensing tube disposed away from the first dispensing tube.

7. The beverage brewing system of claim 1, wherein the hot water reservoir is operable to selectively deliver hot water to each of the plurality of brew groups.

8. The beverage brewing system of claim 1, wherein the plurality of brew groups comprise at least three brew groups.

9. The beverage brewing system of claim 1, wherein the plurality of brew groups are all disposed within a single enclosure.

10. The beverage brewing system of claim 1, wherein the plurality of brew groups are selectively operable to cooperatively produce at least forty-eight ounces of brewed beverage in a single pour.

11. The beverage brewing system of claim 10, wherein the plurality of interconnected controllers are selectively operable to produce at least ninety-six ounces of brewed beverage at a single dispensing location in not more than 128 seconds.

12. The beverage brewing system of claim 1, wherein the volume of brewed beverage produced in a single brewing cycle by each brew group in the plurality of brew groups is selectably variable.

13. The beverage brewing system of claim 12, wherein the volume selectable for each brew group includes twelve ounces, sixteen ounces, and twenty ounces.

14. The beverage brewing system of claim 1, further comprising a plurality of sensors in signal communication with the controller apparatus, wherein each of the plurality of sensors is associated with one of the plurality of brew groups and is operable to measure a property of brewed liquid dispensed from the associated brew group.

15. The beverage brewing system of claim 14, wherein the plurality of sensors measure the total dissolved solids in the brewed liquid.

* * * * *